Feb. 14, 1928.
J. WHISLER
1,659,419
SAW SETTING TOOL
Filed June 19, 1926
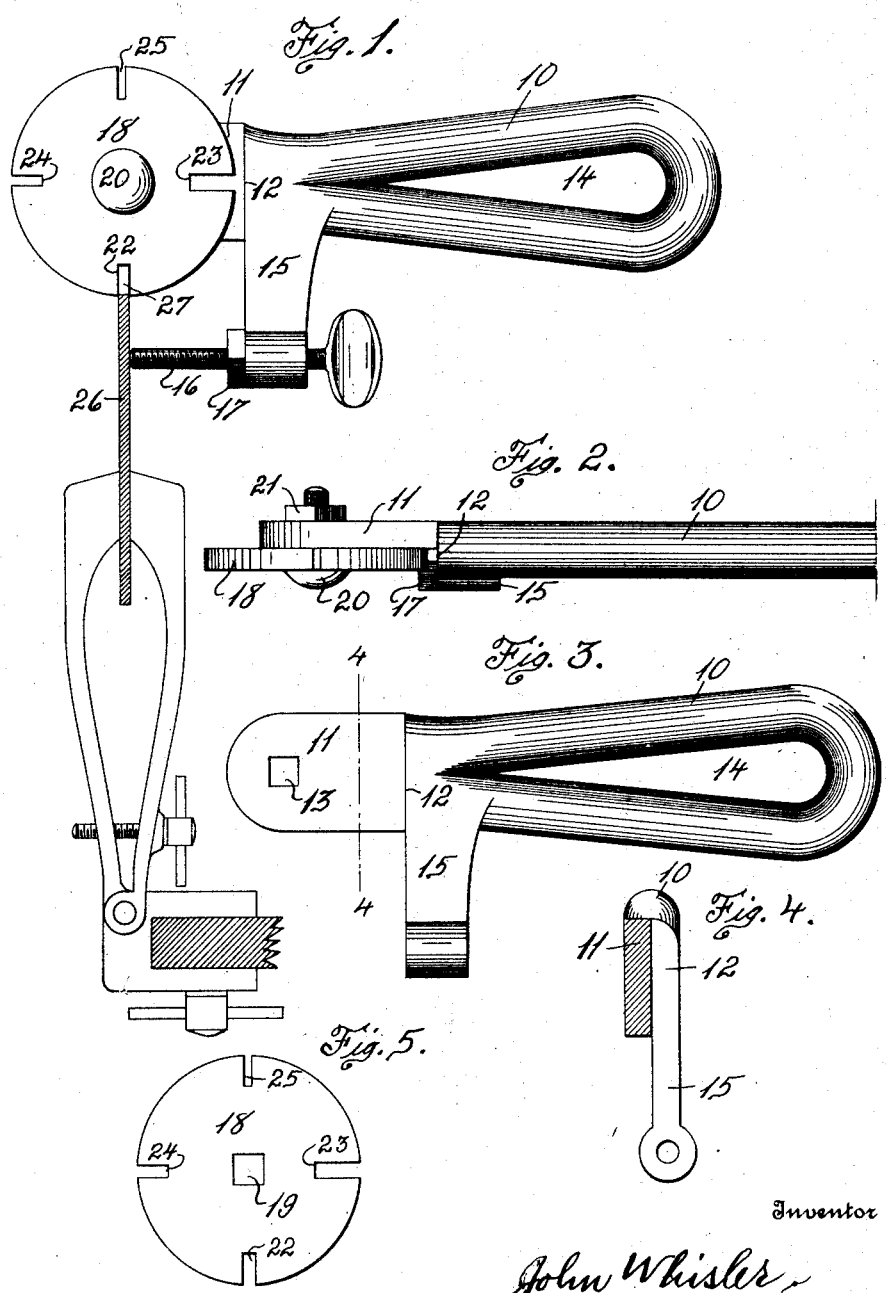
Inventor
John Whisler,
By Silas Sweet
Attorney Patented Feb. 14, 1928.

1,659,419

UNITED STATES PATENT OFFICE.

JOHN WHISLER, OF OTTUMWA, IOWA.

SAW-SETTING TOOL.

Application filed June 19, 1926. Serial No. 117,136.

An object of this invention is to provide improved means for setting a saw.

A further object of this invention is to provide improved means for adjusting a saw-setting tool to saw teeth of varying thicknesses.

A further object of this invention is to provide improved means for adjusting the set of teeth in a saw through adjustment of an element on a saw-setting tool.

My invention consists in the construction, arrangement and combination of elements hereinafter set forth, pointed out in the claims and illustrated by the accompanying drawing, in which—

Figure 1 is a side elevation of my improved tool mounted as required for practical uses. Figure 2 is a plan of the same. Figure 3 is a side elevation of the handle portion of the tool, other parts being removed. Figure 4 is a cross section of the tool on the indicated line 4—4 of Figure 3. Figure 5 is an elevation of an adjustable setting device used with the tool.

In the construction of the tool as shown, the numeral 10 designates a handle member formed with an ear 11 at one end, said ear being of less thickness than the handle member, thereby forming a shoulder 12 at the juncture thereof, said ear being formed with an angular hole 13 transversely of the trend of the tool, said handle member being formed with an opening 14 for improvement of design and to lighten the weight thereof. The handle member 10 also is formed with an arm 15 extending downwardly therefrom adjacent to juncture with the ear 11, the outer face of the arm and the shoulder 12 falling in the same transverse plane. A threaded opening is formed in the outer end of the arm 15 substantially parallel with the median line of the handle member and an adjusting screw 16 is threaded in said hole and carries a lock nut 17 on its outer end portion. A setting disk 18 is formed with an angular hole 19 in its central portion and is adapted to be mounted on the ear 11 with a point of its periphery adjacent the shoulder 12, its hole registering with the hole 13 of the ear. A bolt 20, having an angular shank adjacent its head, is mounted through the registering angular holes 19 and 13 in sequence and is secured to the ear 11 non-rotatively, a nut 21 being mounted on a threaded right end portion of said bolt and engaging the outer face of said ear. The setting disk 18 is formed with a plurality of notches 22, 23, 24 and 25 opening through its periphery and said notches are of different widths corresponding substantially to different thicknesses of the saw teeth to be set. The setting disk 18 may be removed, adjusted rotatively and replaced relative to the ear 11 by manual operation, the bolt 20 being removed and replaced during such operation.

In practical use, the saw 26 to be set (other than a circular saw) should be suitably mounted in a vise or holder; a circular saw being supported on its mandrel; the setting disk 18 is adjusted to bring into proximity with the adjusting screw 16 that notch corresponding properly to the thickness of a tooth to be set; the adjusting screw 16 is adjusted in its seat as desired; the tool is manipulated to bring the desired notch, such as 22, into embracing relation with a tooth 27; and the tool is manually oscillated until the outer end of the screw 16 contacts with the blade of the saw 26, thereby binding the tooth 27 obliquely of the blade of the saw. The degree of binding of the teeth, or set, is determined by the projection of the screw 16 toward the saw blade. Accidental rotation of the setting disk 18 is prevented by engagement of the angular shank of the bolt 20 in the angular holes 19 and 13.

I claim as my invention—

1. A saw-setting tool, comprising a handle member having a projection at one end of substantially half the width thereof, and a setting disk removably, replaceably and non-rotatively mounted thereon and substantially filling the offset thereof, said disk being formed with radial notches opening through its periphery.

2. A saw-setting tool, comprising a handle member one end portion thereof being reduced in width, a setting disk removably, replaceably and non-rotatively mounted on the reduced portion thereof, said disk being formed with radial notches opening through its periphery, a lateral arm formed integrally on said handle member at the inner end of said reduced portion, together with an adjusting screw mounted in the outer end of said arm substantially parallel with the median line of the handle member and projecting toward the radial plane of one of the notches in the disk.

3. A saw setting tool, comprising a handle member, an ear of reduced thickness projecting therefrom formed with an angular hole, a shoulder being formed at the juncture of ear and handle member, said handle member being formed with a lateral arm substantially coinciding with said shoulder, said arm being formed with a screw set substantially parallel with the median line of the handle member, a set disk formed with radial notches of different widths and also formed with an angular central hole adapted to register with the hole in the ear, a bolt having an angular shank mounted through the holes of the ear and disk and adapted to clamp said disk to said ear, and an adjusting screw mounted in said screw set and projecting at one end toward the radial plane of one of the notches of the disk.

Signed at Ottumwa, in the county of Wapello and State of Iowa, this 4 day of June, 1925.

JOHN WHISLER.